(12) United States Patent
Zeigler

(10) Patent No.: US 6,176,623 B1
(45) Date of Patent: Jan. 23, 2001

(54) FLANGE PILOTED DRAWN INVERTED ROLLER BEARING

(75) Inventor: Robert E. Zeigler, New Hartford, CT (US)

(73) Assignee: The Torrington Company, Torrington, CT (US)

(*) Notice: Under 35 U.S.C. 154(b), the term of this patent shall be extended for 0 days.

(21) Appl. No.: 09/391,706

(22) Filed: Sep. 8, 1999

(51) Int. Cl.$^7$ .............................. F16C 33/58; F16C 43/08
(52) U.S. Cl. .............. 384/559; 29/898.062; 29/898.066; 384/560; 384/564; 384/569
(58) Field of Search ...................... 384/559, 560, 384/564, 569, 572, 575, 577, 580; 29/898.06, 898.061, 898.062, 898.063, 898.064, 898.066

(56) References Cited

U.S. PATENT DOCUMENTS

| | | | |
|---|---|---|---|
| 2,910,765 | 11/1959 | Heim | 29/898.067 |
| 3,307,891 | * 3/1967 | Carullo | 384/569 |
| 3,700,299 | 10/1972 | Batt | 384/564 |
| 4,081,204 | 3/1978 | Bauer et al. | 384/569 |

FOREIGN PATENT DOCUMENTS 2450-5810 4/1976 (DE).
2352-206 1/1978 (FR).

* cited by examiner

*Primary Examiner*—Thomas R. Hannon
(74) *Attorney, Agent, or Firm*—Robert F. Palermo; John C. Bigler

(57) ABSTRACT

A roller bearing comprises a cylindrical inner race having axial ends folded over an outside surface thereof. A cylindrical roller cage, having a plurality of axially disposed roller pockets with roller retainer bars at radially outer edges thereof, is slid onto the folded ends of the inner race; and a plurality of cylindrical rollers is snap fitted into the roller pockets between the folded ends of the inner race. The roller cage pilots radially on the folded ends of the inner race, and the roller ends pilot axially against the folded ends of the roller cage.

2 Claims, 2 Drawing Sheets

FLANGE PILOTED DRAWN INVERTED ROLLER BEARING

BACKGROUND OF THE INVENTION

This invention relates generally to roller bearings and more particularly to inverted bearings with roller retainers piloted on flanges of the inner race.

Current inverted cylindrical roller bearings, having the rollers on the outside of the race, are made by forming a sleeve on a press to provide a lip at each axial end. The sleeve is heat treated (hardened and tempered), and an axially split roller cage, or retainer, is filled with rollers and wrapped around the sleeve. The cage edges are then joined to retain the roller complement on the sleeve.

This process yields serviceable bearings, but it requires several non-value-added steps which drive up manufacturing costs and introduce risks which contribute nothing to the performance of the finished bearing. The roller retainer (cage), after assembly on the sleeve, requires welding or mechanical fastening. This presents an opportunity for misalignment of the edges of the retainer, distortion of the retainer and the roller pockets, and possible thermal damage to the sleeve and/or the rollers. These discrepant conditions must be corrected by rework which, if unsuccessful requires that the assembly be scrapped.

The foregoing illustrates limitations known to exist in present inverted radial roller bearings. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an inverted roller bearing comprising a cylindrical inner race having axial ends folded over an outside surface thereof; a cylindrical roller cage having a plurality of axially disposed roller pockets with roller retainer bars at radially outer edges thereof fitted over the folded ends of said inner race; and a plurality of cylindrical rollers snap fitted into said roller pockets between said folded ends of said inner race.

The foregoing and other aspects will become apparent from the following detailed description of the invention when considered in conjunction with the accompanying drawings.

DETAILED DESCRIPTION

Figure 1:
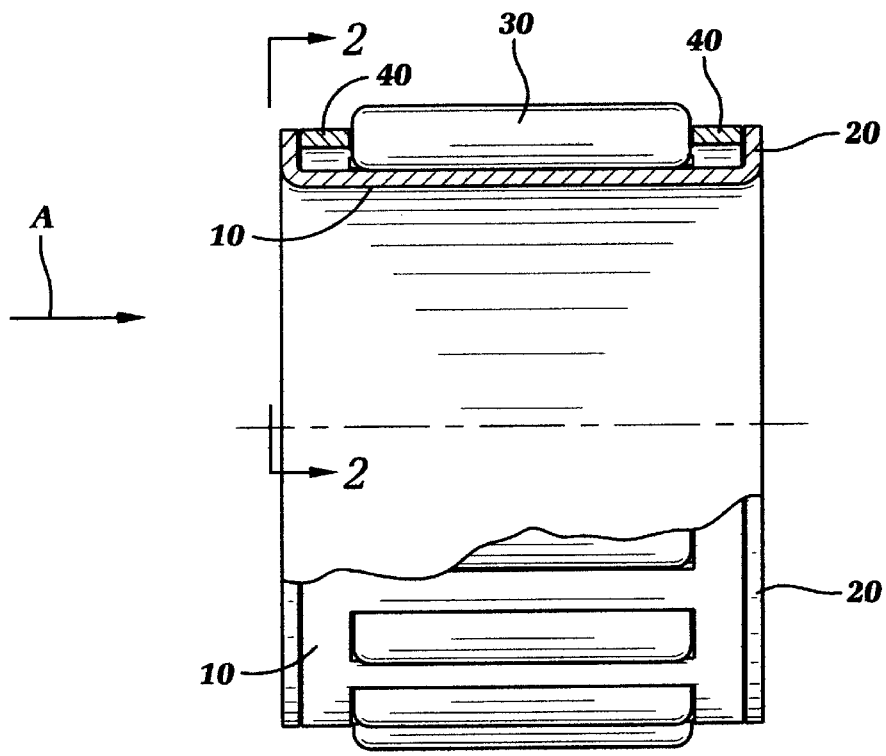
FIG. 1 is a partially cutaway transverse view of an inverted bearing made according to the prior art.
Figure 2:
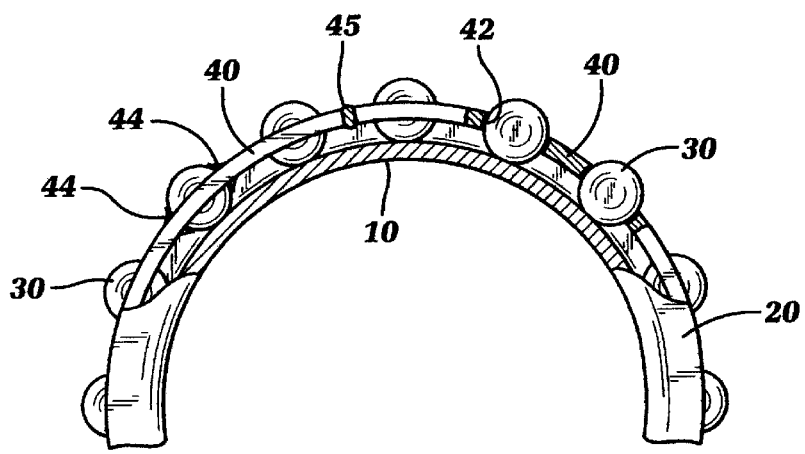
FIG. 2 is a fragmentary longitudinal sectional view along line 2—2 of FIG. 1.

FIGS. 1 and 2 show a typical inverted bearing "A" of the prior art. It has a sleeve or inner race 10 with a lip 20 formed at each axial end about its whole circumference. A roller cage or retainer 40 has roller pockets 42 in which a plurality of rollers 30 are rotatably trapped by retainer bars 44. The cage 40 is wrapped around the sleeve 10 between the lips 20 and joined by a weld 45, by mechanical means, or by other joining means. The cage 40 is axially restrained by the lips 20 to guide the rollers 30 around the sleeve or race 10. During assembly of this bearing there is a chance to lose rollers 30 from the pockets 42 due to separation of the radially outer retainer bars 44 while wrapping the cage 40 around the sleeve 10. It is also possible to misalign the faying surfaces of the cage 40 when welding or joining the cage ends. Finally, there is a chance that mechanically joined edges may separate during shipping or after installation in the end product. In any case, the bearing must be reworked if possible, or it must be scrapped. Of course, in cases of failure of such joints after installation of the bearing, there may be severe damage to components other than the bearing.

Figure 3:
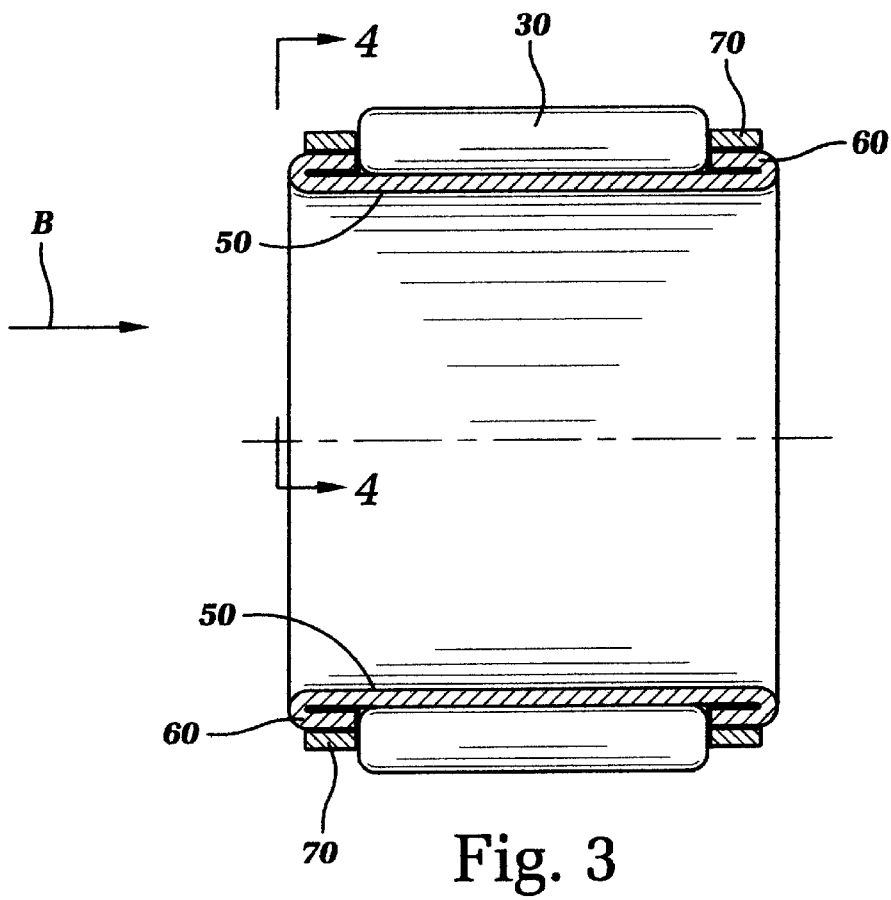
FIG. 3 is a longitudinal sectional view of the inverted bearing of the invention.
Figure 4:
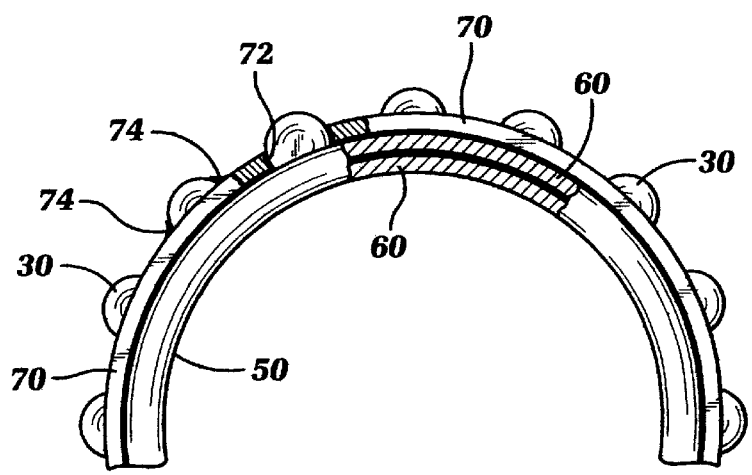
FIG. 4 is a fragmentary partially cutaway view of the bearing along line 4—4 of FIG. 3.

The inverted bearing of the invention avoids or minimizes many of the manufacturing difficulties and defects inherent in bearings of the prior art described above. The bearing "B" illustrated in FIGS. 3 and 4 shows the key features of the invention. It comprises an inner race 50 with folded back ends 60, a roller retainer or cage 70, and rollers 30 which are trapped in roller pockets 72 by retainer bars 74. The unique features of this invention are provided by the method of manufacturing. This method permits forming and assembly of the inverted bearing "B" of the invention while avoiding the risks described above for the inverted bearings "A" of the prior art.

An inner race 50 is formed from a seamless cylindrical tube or sleeve. Its axial ends are folded back upon the outer surface of the race 50 to form a roller channel about the circumference thereof between the resulting flanges 60. A cylindrical roller retainer 70 has a plurality of roller pockets 72 with retainer bars 74 only on the outer edges of the pockets. This is, preferably made as a flat strip, with the roller pockets 72 and retainer bars 74 formed therein; rolled, welded or otherwise permanently joined to form a continuous cylindrical roller cage or retainer 70, and sized and trued on a mandrel, if necessary. It may also be made from a seamless cylindrical tube which is sized on a mandrel, if necessary, to provide a controlled inner diameter. The cage or retainer is fitted over the race 50 so that its ends pilot radially on the flanges 60. Rollers 30 are then snapped into the roller pockets 72. After the rollers 30 are in place in the roller channel between the edges of the flanges 60, the retainer or cage 70 is axially located by axial piloting action of the ends of the rollers 30 on the edges of the flanges 60.

Formation of the roller retainer as a continuous cylindrical body with no mechanical seam or joint provides assurance that the bearing rollers and retainer will not become separated from the inner race or misaligned in shipping and handling. The provision of the folded back flanges, together with the continuous cylindrical roller retainer, permits simplified assembly without further welding or forming operations on the components.

Having described the invention, I claim:

1. An inverted roller bearing comprising:

a cylindrical inner race having axial ends folded over an outside surface thereof;

a cylindrical roller cage having a plurality of axially disposed roller pockets with roller retainer bars at radially outer edges thereof, said cage being slid over the folded ends of the inner race; and a plurality of cylindrical rollers snap fitted into said roller pockets between said folded ends of said inner race.

2. A method for making an inverted radial roller bearing, comprising the following steps:

providing a cylindrical sleeve having a required inner and outer diameter;

forming said cylindrical sleeve to provide an inner race with a circumferential flange at each axial end, said flanges being formed by folding each end back upon the outer surface of said sleeve;

providing a cylindrical roller cage having a plurality of roller pockets with roller retainer bars at radially outer edges thereof and a length substantially equal to the length of the cylindrical inner race;

sliding said roller cage onto said cylindrical inner race to pilot on said circumferential flanges; and snapping a plurality of cylindrical rollers into said roller pockets between said flanges.

\* \* \* \* \*